Nov. 2, 1948.   C. H. ROBERTS   2,452,792
COLLAPSIBLE STAND
Filed Oct. 30, 1945
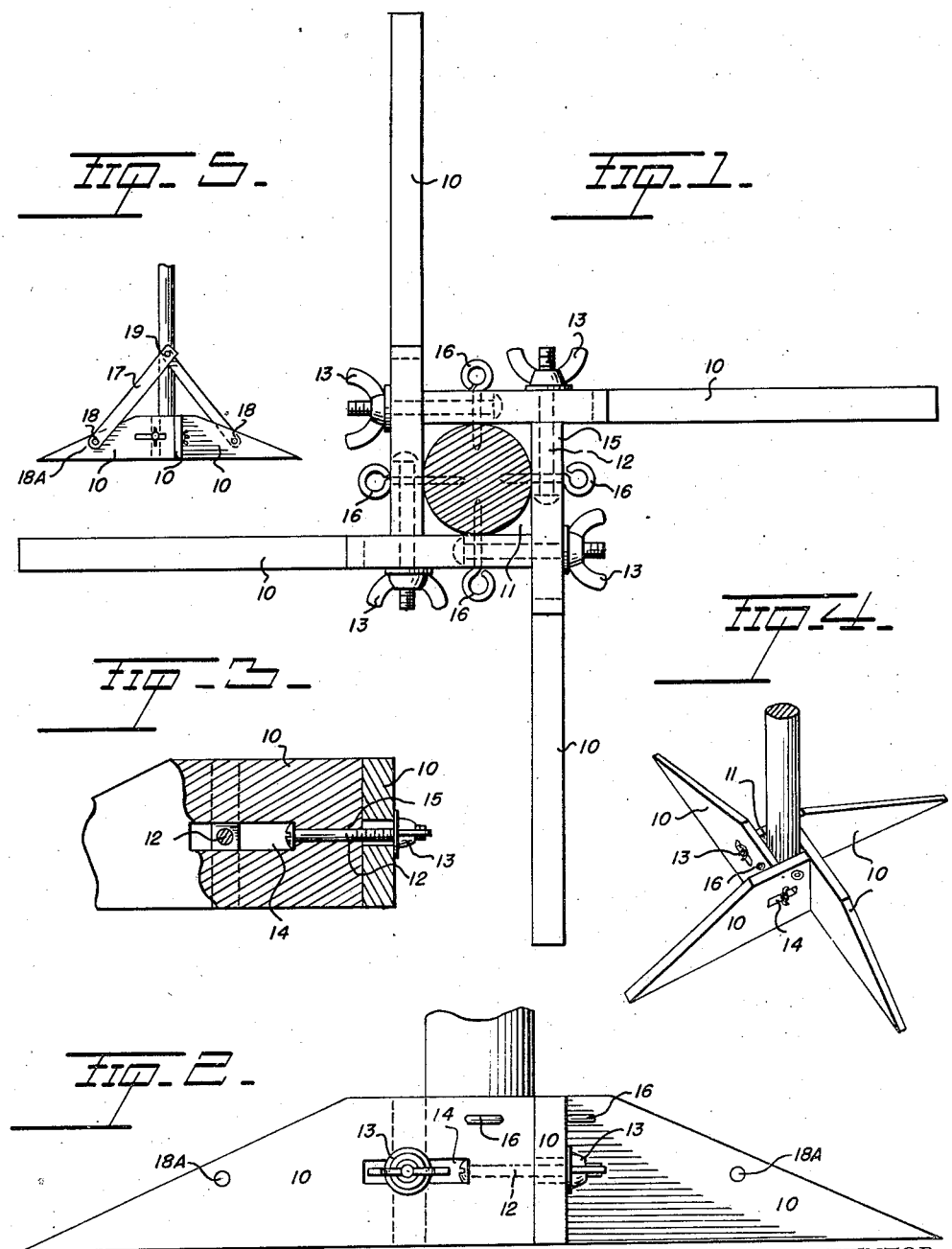
INVENTOR.
CHARLES H. ROBERTS
BY Victor J. Evans & Co.
ATTORNEYS Patented Nov. 2, 1948

2,452,792

UNITED STATES PATENT OFFICE 2,452,792

COLLAPSIBLE STAND

Charles H. Roberts, Cheyenne, Wyo.

Application October 30, 1945, Serial No. 625,615

1 Claim. (Cl. 248—48)

This invention relates to a holder for Christmas trees and more particularly, to a collapsible and adjustable Christmas tree stand.

It is the object of this invention to provide firm support for a tree of any reasonable diameter since the legs of the tree holder are adjustable with respect to one another so permitting the reception therebetween of a tree of any reasonable diameter, and to provide a collapsible stand which may be easily packaged for sale and easily stored when not in use.

The invention will be better understood from the following detailed description thereof with reference to the accompanying drawings, in which—

Figure 1 is a plan view of the new tree stand;

Figure 2 is a side view thereof;

Figure 3 is a side cross-sectional view, showing manner of male and female connections;

Figure 4 is a perspective view thereof; and

Figure 5 is a side view thereof, and shows the additional supporting braces.

Duplicate legs 10, preferably made of wood, are arranged to form a space 11, said arrangement being such that each leg is at a right angle to the two contacting legs, said legs 10 are secured together by bolts 12 and winged nuts 13. Each of said legs 10 have a slot 14 in the side thereof and a passage 15 therein, each of the bolts 12 are positioned in passage 15 and extend through slot 14. Each of said winged nuts 13 are threaded onto bolt 12.

Each of the slots 14 are of such a size as to permit a variation in the position of the point of contact of said legs 10 with each other for reception of trees of various sizes in space 11, said legs 10 having a threaded holding means or screw eyes 16 therethrough, said screw eyes beign of such a length as to extend into and securely hold the tree, and the eyes on their outer end permit manipulation thereof when threadably engaged with the tree.

The winged nuts 13 are loosened to permit the legs 10 to make space 11 of a proper size for the reception of a tree. To take up slack space between legs 10 and tree, the nuts 13 are tightened on bolts 12, thus varying the position of the point of contact of each of the legs 10 with each other and bringing the sides of legs 10 to bear on the tree. When the winged nuts 13 are holding the legs 10 flush against the tree, screw eyes 16 are extended into the tree.

The stand is easily dismounted by loosening winged nuts 13 by hand and insertion of a screw driver or other instrument in screw eyes 16 for loosening the same. Legs 10 may then be easily and compactly stacked for storage and are easily packaged for sale as well.

If necessary, braces 17 may be used with the stand and secured by means of bolts and wing nuts 18 in slots 18a and at 19 by means of screw eyes similar to those at 16. Less conveniently, nails or ordinary screws could be used as substitutes for bolts 12 or screw eyes 16 and such are within the scope of the invention.

Although the present invention is described in detail, it is to be understood that the invention is not limited to the details of construction and the specific arrangement of parts herein illustrated or described as the invention obviously may take other forms. It is also to be understood that the phraseology or terminology herein employed is for thep urpose of description and not of limitation.

Having thus described the invention, what is claimed as new and desired to be secured by Letters Patent is:

A tree stand for supporting Christmas trees, comprising duplicate legs, each of said legs contacting two other of said legs, said each first mentioned legs arranged at a right angle to each of the said other legs, said first mentioned legs coming in contact with each other, bolts in the ends of said legs, a slot in the side of each leg rearwardly of the inner end of said bolt, said slots adapted to receive the bolts of the legs set at right angles thereto, said slots being of a size to permit variation in the position of the point of contact of said legs with each other for reception of trees of various sizes in the space between said legs, each of said legs having a passage therein extending from one end of said slot to the corresponding end of said leg, braces secured to said legs and said tree at each end thereof, nuts on said bolts for holding said legs in fixed relation to each other, and holding means in said legs of a size large enough to extend into the tree, said holding means adapted to enter the tree intermediate of the bolts on the legs, when the stand is in assembled portions, but above the plane of the bolts so that said holding means do not interfere with the assembly of said stand.

CHARLES H. ROBERTS.

REFERENCES CITED

The following references are of record in the file of this patent:

UNITED STATES PATENTS

| Number | Name | Date |
|---|---|---|
| 573,225 | Kurtz | Dec. 15, 1896 |
| 1,568,758 | Malcolm | Jan. 5, 1926 |
| 2,159,760 | Fitzgerald | May 23, 1939 |